UNITED STATES PATENT OFFICE.

CASSIUS C. MARKLE AND JOSEPH JORDAN, OF PITTSBURG, PENNSYLVANIA.

RECOVERING SODA FROM SPENT LIQUORS AFTER TREATING VEGETABLE FIBER.

SPECIFICATION forming part of Letters Patent No. 229,264, dated June 29, 1880.

Application filed January 9, 1880.

*To all whom it may concern:*

Be it known that we, JOSEPH JORDAN and CASSIUS C. MARKLE, of the city of Pittsburg, State of Pennsylvania, have invented certain new and useful Improvements in the Process of Recovering the Soda from the Waste Liquors used in the Reduction of Vegetable Fiber to Paper-Pulp; and we do hereby declare the following to be a full, clear, and exact description of the same.

The object of our invention is to economize the cost of manufacturing pulp from vegetable fiber by uniting the causticizing agent with the soda in the course of the process of eliminating the latter from the waste liquors resulting from digesting vegetable fiber in the manufacture of paper-pulp.

There have been published and patented various devices and processes of recovering the soda from the waste liquor above named; and our invention simply relates to introducing the causticizing agent during that process.

The processes described in the United States Letters Patent of Keene and Burgess, dated February 7, 1865, No. 46,244, and that of John Dixon, of July 4, 1876, No. 179,536, and others, and those in common and public use, fully described and set forth to those skilled in the art the processes of burning out, by ignition, the foreign material and saving the soda contained in the said waste liquor.

It is not our object to introduce anything new in the said processes as such; but it is well known that the product of the said process has subsequently to be lixiviated and the soda rescued from its accompanying impurities, and then it has to be rendered caustic by the addition of lime and boiling the lime and soda together in solution before being again used in the manufacture of paper-pulp.

Paper-manufacturers have to keep on hand large quantities of lime for the above purpose, which, by being kept long in storage, frequently becomes air-slaked, so as to be in part or wholly useless as an agent for rendering alkali caustic. It is part of the object of our invention to use this air-slaked lime by giving to it again the properties which it has lost. And another great loss to lime-dealers is, that portion of their stock which is kept on hand becomes air-slaked and loses its strength and value. We can use this to as good effect as first-class lime in our process.

It is well known that lime exposed to the action of the air will slowly absorb carbonic acid and lose its virtue as a caustic agent, as a caustic or quick lime, and so become useless as an agent to causticize the soda referred to; and it is also well known that the lime of commerce, in lumps of various sizes, is, comparing piece with piece, of various strengths. The furnace in which it has been burned does not affect various sizes and pieces equally, whereby one piece is of greater causticizing strength than another.

By first powdering and burning again the lime, whether new or air-slaked, we renew all its virtues and strengthen and equalize the valuable qualities of the poorly-burned lime.

In the process of evaporating and burning or incinerating the waste liquor in the processes above referred to an intense heat is produced, and we simply drop powdered or broken-up lime into the mass of material under treatment, at about the stage when evaporation has ceased and incineration and burning of the mass has begun, and at intervals during the subsequent process. The heat being very intense, the lime, if it has been air-slaked or improperly burned in the kiln, recovers its former strength and is burned more perfectly than ever, whereby all or as much as possible of carbonic acid is burned out of it, and its causticizing qualities are increased. We introduce it by blowing it over the mass in the furnace or oven by means of a blower, or we drop it by means of hoppers at various points in the furnace, one great object being to distribute it equally; or, instead of using the furnace-blower to distribute it, we use pipes or conduits from a lime-reservoir, either in conjunction with blowers or by allowing the lime to fall of its own gravity, or we can throw it in by shovels through the traps or stirring-doors at the sides of the oven. If it is blown in, care should be exercised that it does not pass up the stack or chimney. This can be prevented by closing the stack at the instant of blowing. It may be advisable to introduce the lime to the waste liquor before or at the time at which evaporation is taking place and long before the mass is incinerated.

In evaporation sometimes a thick scum of unsaponified vegetable matter will form over the mass and retard evaporation. This introduction of lime in such a case will destroy the scum and open up the surface for evaporation.

We are aware of the Letters Patent heretofore granted numbered 39,653 and 54,093, and we disclaim the processes therein shown. Our invention is designed as an improvement upon that peculiar process of recovering the soda, wherein the mass of waste material is actually incinerated, and we aim to produce a better caustic soda by burning both the lime and the waste matter together in a furnace by means of the contact of flame therewith, whereby the lime is brought to the condition of perfect causticity, and, if it has been air-lixiviated or slaked by lying in disuse, all of its lost causticizing qualities are restored and utilized.

The heat used in our process is sufficient in degree to drive off all carbonic acid, and to render caustic both the lime employed and the alkali to be reclaimed.

Having thus described our invention, what we claim as new, and desire to secure by Letters Patent, is—

1. In the process of recovering the soda from waste liquor used in the manufacture of paper-pulp, mixing the agent used to render the alkali caustic with the mass being treated and incinerating them together, substantially as described.

2. In the process of recovering the soda from waste liquor used in the manufacture of paper-pulp, mixing the agent used to render the alkali caustic with the mass being treated at about the time when the mass becomes dehydrated and incineration begins, substantially as described.

3. In the process of recovering the soda from waste liquor used in the manufacture of paper-pulp, mixing therewith powdered or broken-up lime as an agent to render the alkali caustic and burning the mass together, substantially as described.

JOSEPH JORDAN.
CASSIUS C. MARKLE.

Witnesses:
GEORGE E. BUCKLEY,
WM. H. CARSON,
B. F. OVERHILL,
S. N. KINDLE.